(12) United States Patent
Claessens et al.

(10) Patent No.: US 12,638,647 B2
(45) Date of Patent: May 26, 2026

(54) OPTICAL FIBER MANAGEMENT TRAY ASSEMBLIES WITH IMPROVED FIBER ROUTING CONFIGURABILITY

(71) Applicant: COMMSCOPE CONNECTIVITY BELGIUM BV, Kessel-Lo (BE)

(72) Inventors: Bart Mattie Claessens, Hasselt (BE); Pieter Doultremont, Kermt-Hasselt (BE)

(73) Assignee: COMMSCOPE CONNECTIVITY BELGIUM BV, Kessel-Lo (BE)

( * ) Notice: Subject to any disclaimer, the term of this patent is extended or adjusted under 35 U.S.C. 154(b) by 539 days.

(21) Appl. No.: 17/798,490

(22) PCT Filed: Feb. 11, 2021

(86) PCT No.: PCT/EP2021/053330
§ 371 (c)(1),
(2) Date: Aug. 9, 2022

(87) PCT Pub. No.: WO2021/160734
PCT Pub. Date: Aug. 19, 2021

(65) Prior Publication Data
US 2023/0096710 A1 Mar. 30, 2023

Related U.S. Application Data

(60) Provisional application No. 62/976,419, filed on Feb. 14, 2020.

(51) Int. Cl.
*G02B 6/44* (2006.01)

(52) U.S. Cl.
CPC ....... *G02B 6/4455* (2013.01); *G02B 6/44526* (2023.05); *G02B 6/44528* (2023.05); *G02B 6/4446* (2013.01)

(58) Field of Classification Search
CPC ...................................................... G02B 6/44
USPC ...................................................... 385/135
See application file for complete search history.

(56) References Cited

U.S. PATENT DOCUMENTS

| | | | | |
|---|---|---|---|---|
| 5,323,480 A | * | 6/1994 | Mullaney | G02B 6/4442 385/134 |
| 6,263,141 B1 | * | 7/2001 | Smith | G02B 6/4455 385/135 |
| 7,613,377 B2 | * | 11/2009 | Gonzales | G02B 6/4455 385/134 |

(Continued)

FOREIGN PATENT DOCUMENTS

| | | |
|---|---|---|
| EP | 2 369 388 A1 | 9/2011 |
| WO | 2017/046190 A2 | 3/2017 |

(Continued)

OTHER PUBLICATIONS

International Search Report and Written Opinion of the International Searching Authority for International Patent Application No. PCT/EP2021/053330 mailed May 10, 2021, 14 pages.

*Primary Examiner* — Kaveh C Kianni
(74) *Attorney, Agent, or Firm* — Merchant & Gould P.C.

(57) ABSTRACT

Optical fiber management tray assemblies for optical fiber closures. The tray assemblies include features that enable different fiber routing schemes and configurations depending on specific fiber routing needs at a given fiber optic closure. A plurality of inner fiber management trays can pivotally mount to an outer fiber management tray.

15 Claims, 19 Drawing Sheets

(56)                    References Cited

U.S. PATENT DOCUMENTS

| | | | | |
|---|---|---|---|---|
| 10,444,455 | B2 * | 10/2019 | Aznag ................. | G02B 6/4454 |
| 2006/0275008 | A1 * | 12/2006 | Xin .................... | G02B 6/44526 |
| | | | | 385/135 |
| 2011/0026894 | A1 * | 2/2011 | Rudenick .............. | G02B 6/445 |
| | | | | 385/137 |
| 2017/0363831 | A1 * | 12/2017 | Cornelissen ......... | G02B 6/3897 |
| 2021/0055496 | A1 * | 2/2021 | Allen ................... | G02B 6/2551 |

FOREIGN PATENT DOCUMENTS

| | | | |
|---|---|---|---|
| WO | 2019/160995 | A1 | 8/2019 |
| WO | 2019/212887 | A1 | 11/2019 |
| WO | 2020/205572 | A1 | 10/2020 |

* cited by examiner

*FIG. 5*

OPTICAL FIBER MANAGEMENT TRAY ASSEMBLIES WITH IMPROVED FIBER ROUTING CONFIGURABILITY

CROSS-REFERENCE TO RELATED APPLICATION

This application is a National Stage Application of PCT/EP2021/053330, filed on Feb. 11, 2021, which claims the benefit of U.S. Patent Application Ser. No. 62/976,419, filed on Feb. 14, 2020, the disclosures of which are incorporated herein by reference in their entireties. To the extent appropriate, a claim of priority is made to each of the above-disclosed applications.

BACKGROUND

Fiber optic cables carry optical fibers used to transmit optical signals between providers and subscribers. Typically, large cables, such as trunk cables or "main" cables, carry a large number of fibers. The fibers of the main cable are spliced, split, optically connected to other fibers (e.g., via fiber optic connectors), or otherwise managed and routed to a desired destination, (e.g., a subscriber building). Due to the large number of fibers that need to be managed and routed, the main cable is often terminated in a fiber optic splice closure. Such fiber optic splice closures typically include an outer ruggedized and sealable shell defining an interior volume and one or more sealable ports for sealed cable entry to the interior. The closures can be adapted for outdoor or indoor use. The interior volume of a splice closure typically houses structures and equipment, such as splice trays to organize and route fibers to facilitate both storing of fibers and routing of fibers to their desired destinations.

The fibers of the cables that enter the closures can come in different forms, such as loose fibers or ribbonized fibers. Groups of loose fibers, e.g., groups of 12 loose fibers, or axial portions thereof, can be housed in protective tubes. Ribbonized fibers (or a fiber ribbon) includes a plurality of fibers, e.g., 12 fibers, bonded together. The fibers of the ribbon can be bonded side by side along their axial lengths to form a flat ribbon, or bonded at intervals along their axial lengths to form a rollable ribbon.

Depending on specific signal routing requirements at a given closure, it may be desirable to route fiber ribbons, loose fibers or both. As the number of fibers managed at a given closure increases, keeping track of the fibers can become increasingly challenging.

SUMMARY

In general terms, the present disclosure is directed to fiber optic closures and optical fiber management assemblies that can be housed in the fiber optic closures.

According to certain aspects, the fiber management assemblies are configurable in multiple fiber routing configurations.

The fiber routing configurations can include individual fiber splices and mass splices, such as mass fusion splices.

According to certain aspects, a lower fiber management tray includes a fiber management surface defining a plurality of mounting structures that mount a plurality of inner fiber management trays.

According to certain aspects, the inner fiber management trays can pivot relative to the outer fiber management tray.

According to certain aspects, the outer fiber management tray is alternatively configured to manage fiber ribbons and support fiber ribbon splices.

According to certain aspects, the outer fiber management tray is alternatively configured to manage individual fibers and support individual fiber splices or multi-fiber splices.

According to certain aspects, the inner fiber management trays are configured to manage individual fibers and support individual fiber splices.

In accordance with certain specific aspects of the present disclosure, an optical fiber management assembly, comprises: a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber, the first fiber management surface defining a plurality of first mounting structures for mounting fiber management components; and a plurality of second fiber management trays pivotally mountable to the first mounting structures such that the plurality of second fiber management trays can be pivoted away from and toward the first fiber management surface, each of the second fiber management trays including a planar second fiber management surface and a second wall extending away from the second fiber management surface about a portion of a perimeter of the second fiber management surface, the second fiber management trays including pluralities of fiber retainers to retain looped fiber or portions of looped fiber at the second fiber management surfaces.

In accordance with certain further aspects of the present disclosure, an optical fiber management assembly, comprises: an adapter, including: an adapter body; a first coupling portion extending from the adapter body and configured to connect to a mounting structure at a fiber management surface of a first fiber management tray; and a second coupling portion extending from the adapter body and having a hinge element configured to pivotally mate with a complementary hinge element of a second fiber management tray to pivotally mount the second fiber management tray to the first fiber management tray.

In accordance with certain further aspects of the present disclosure, an optical fiber management assembly, comprises: a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber at the perimeter of the first fiber management surface, the first fiber management surface defining a plurality of mounting structures, the mounting structures being configured to mount an optical fiber splice holder and/or an optical fiber splitter holder; and a second fiber management tray configured to pivotally mount to the mounting structures.

In accordance with certain further aspects of the present disclosure, an optical fiber management assembly, comprises: a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber, the first fiber management surface defining a plurality of first mounting structures for mounting fiber management components; and a plurality of second fiber management trays mountable to the first mounting structures, each of the second fiber management trays including a planar second fiber management surface and a second wall extending away from the second fiber management surface about a portion of a perimeter of the second fiber management surface, the second fiber management trays including pluralities of fiber retainers to retain looped fiber or portions of looped fiber at second fiber management surfaces, the second fiber management surfaces supporting splice holders.

In accordance with further aspects of the present disclosure, a fiber management tray extending along a first horizontal axis from a proximal end to a distal end and along a vertical axis from a top to a bottom, comprises: a planar upward facing first fiber management surface configured to support an optical fiber splice holder; and a planar upward facing second fiber management surface configured to support a looped fiber, the second planar fiber management surface being positioned distally from the first fiber management surface along the first horizontal axis and lower than the first fiber management surface along the vertical axis.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

Figure 5:
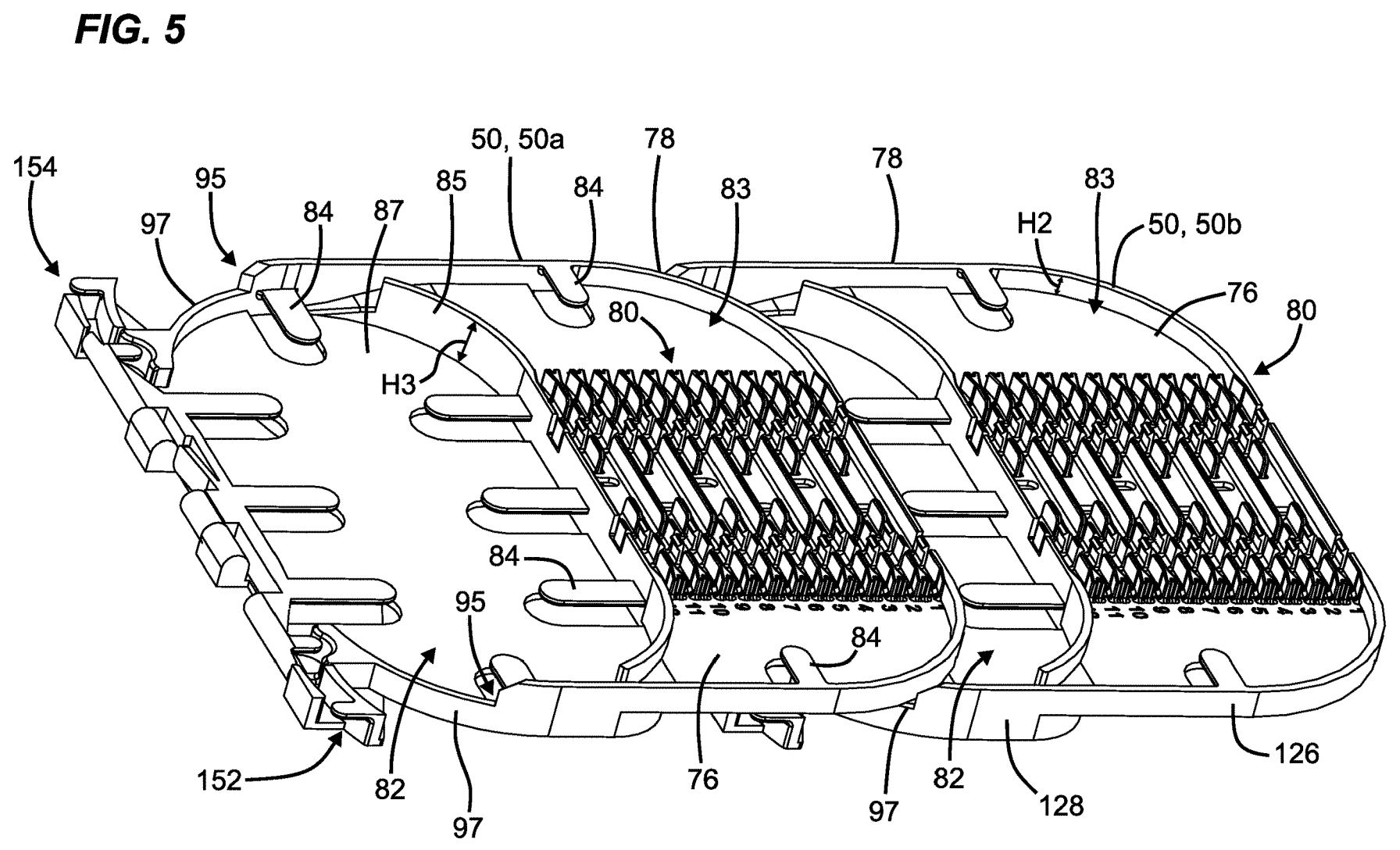

FIG. 5 is a perspective view of a subassembly of two inner fiber management trays of the optical fiber management assembly of FIG. 3, the inner fiber management trays being in a nested configuration.

DETAILED DESCRIPTION

Figure 1:
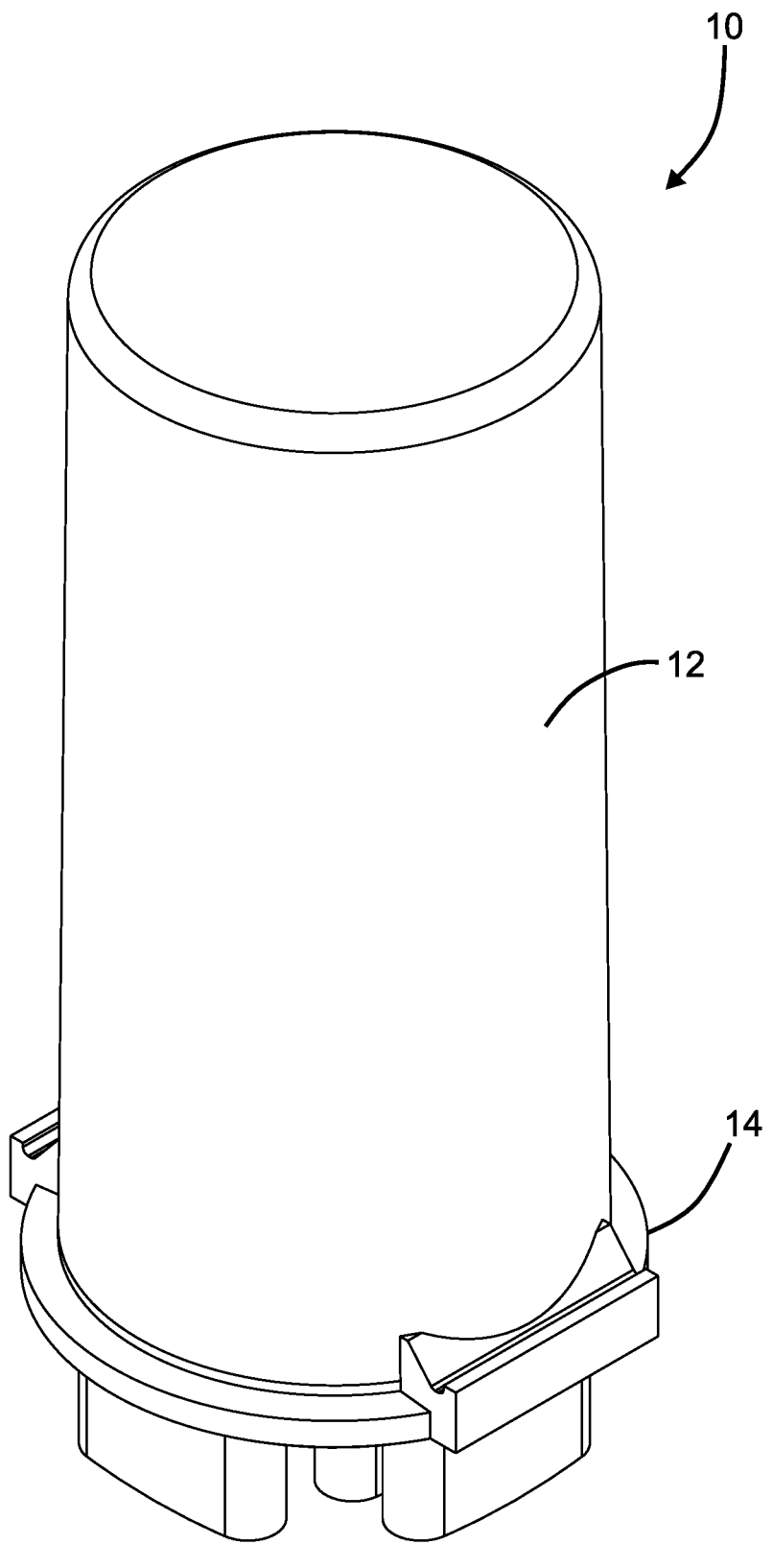
FIG. 1 is a perspective view of an example telecommunications closure that can house an optical fiber management assembly according to the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
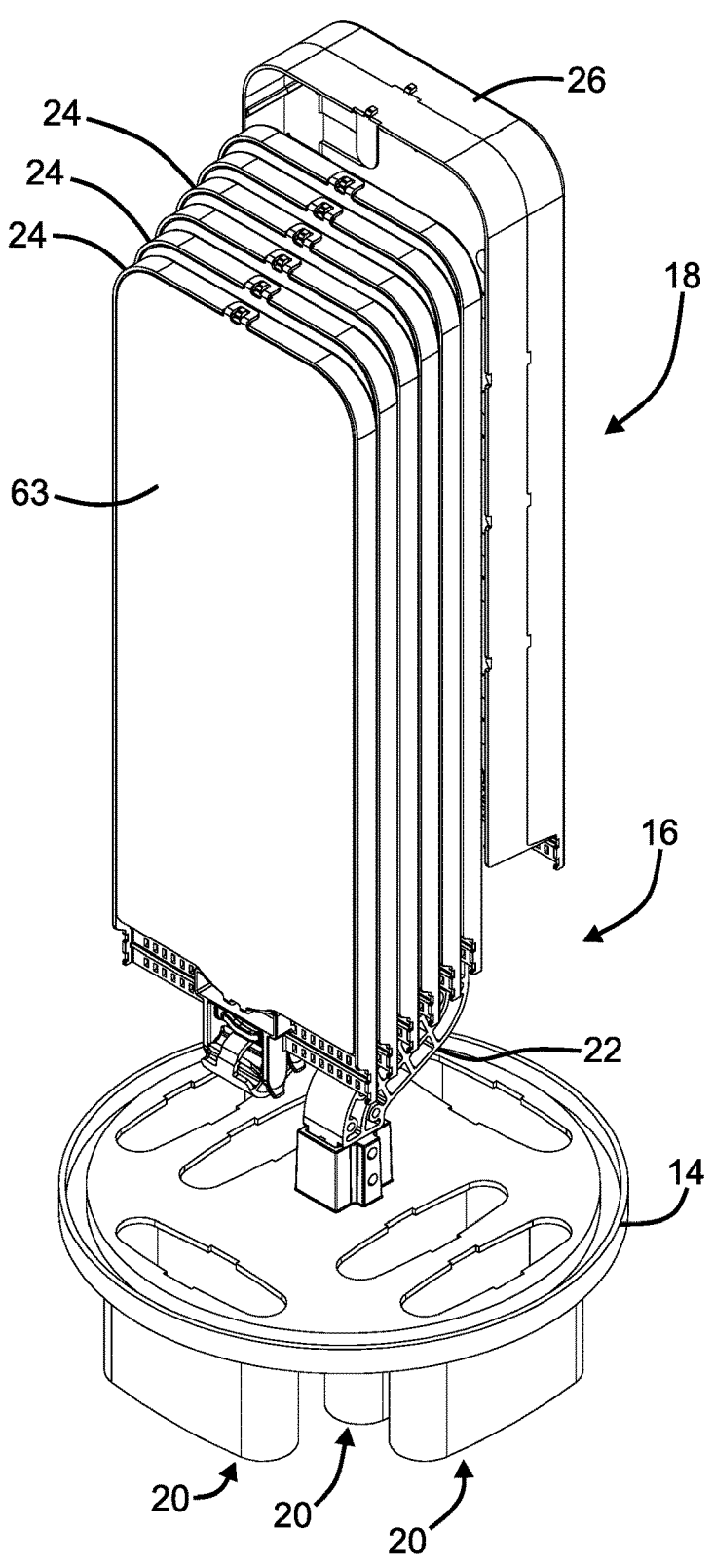
FIG. 2 is a perspective view of a portion of the closure of FIG. 1, the closure being in an open configuration.

Referring to FIGS. 1-2, the fiber optic closure 10 includes a first housing piece 12 (in this case, a dome), and a second housing piece 14 configured to cooperate with the first housing piece to define a sealable and re-enterable telecommunications closure for managing optical fibers. The first and second housing pieces 12, 14 define an interior closure volume 16 in which fiber managing equipment 18 can be housed. Cables carrying optical fibers can sealingly enter the closure volume 16 via sealable ports 20 defined by the second housing piece 14. Such cables can include trunk cables, feeder cables, branch cables, and distribution cables (also known as drop cables). Typically, optical fibers from one cable entering the closure are spliced to optical fibers of one or more other cables entering the closure to establish an optical signal path at the closure 10 from a provider side cable to one or more customer side cables. In addition to splicing, other fiber managing activities can be performed with telecommunications equipment housed within the closure volume 16. Such fiber managing activities can include indexing fibers, storing fibers (typically in one or more loops) and splitting fibers.

Splices, such as mechanical splices or fusion splices, can be performed at the factory or in the field, e.g., at the closure 10 positioned in the field.

The cables entering the closure can include fibers of different configurations such as loose fibers and fiber ribbons. The fiber ribbons can be flat ribbons or rollable ribbons. The loose fibers can be individual fibers or bundled loose fibers protected by a common protective sheath or tube. Such a protective sheath can hold any suitable number of loose individual fibers, e.g., 4, 6, 8, 10, 12, or more loose individual fibers. The fiber ribbons can likewise include any suitable number of bonded individual fibers, such as 4, 6, 8, 10, 12, or more fibers.

For fiber ribbons, the fibers of the entire ribbon can be spliced to the fibers of a corresponding fiber ribbon at the same time, e.g., using a mass fusion splicing procedure. In addition to time efficiency advantages, mass splices also generally require less space to be occupied per splice, as the splice body is shared and distributed amongst multiple fibers.

Splice bodies protect the splices both in the case of individual fiber splices and mass fiber splices, such as mass fusion splices. The splice bodies are held in splice holders. In fiber management assemblies of the present disclosure, the splice holders are mounted to fiber management trays that are housed in the interior closure volume 16.

The fiber managing equipment 18 includes a main tray support 22 that pivotally mounts a plurality of outer trays 24. Pivoting one or more of the outer trays 24 away from another of the outer trays 24 can permit access to the another outer tray 24 for performing fiber management (e.g., splicing, storing, splitting) thereon.

The fiber managing equipment 18 also includes a basket 26 for storing loops of cable or sheath-protected fiber.

Each of the outer trays 24 form part of an optical fiber management assembly 30 in accordance with the present disclosure, as will be described in more detail below. In addition, the fiber managing equipment 18 constitutes a fiber management assembly that includes a plurality of the fiber management assemblies 30.

The closure 10 can be adapted for outdoor and/or indoor environments, and can be positioned above or below grade (e.g., in a hand hole).

Referring now to FIGS. 3-18, the optical fiber management assembly 30, and components thereof, will be described.

The optical fiber management assembly 30 extends along a longitudinal axis 32 between a proximal end 34 and a distal end 36. The optical fiber management assembly 30 extends along a transverse axis 38 between a first side 40 and a second side 42, the transverse axis 38 being perpendicular to the longitudinal axis 32. The optical fiber management assembly 30 extends along a vertical axis 44 between a top 46 and a bottom 48, the vertical axis 44 being perpendicular to the longitudinal axis 32 and the transverse axis 38. Dimensions parallel to the longitudinal axis 32 will be referred to herein in terms of length. Dimensions parallel to the transverse axis 38 will be referred to herein in terms of width. Dimensions parallel to the vertical axis 44 will be referred to herein in terms of height or depth. It should be appreciated that terms such as proximal, distal, top, bottom, upper, lower, vertical, horizontal, etc. are used for ease of description in relating portions of the assemblies and components to other components, and are not intended to limit in anyway how the assemblies or their components may be used in practice.

The assembly 30 includes an outer tray 24 to which are pivotally mounted a plurality of inner trays 50. A mounting portion 52 of the outer tray 24 at the proximal end 34 of the outer tray 24 includes a pair of hinge pins 54 and a rotation stop bar 56. The hinge pins 54 mount in pin holes (or opposite sides of the same pinhole) of the tray support 22 (FIG. 2), allowing pivoting of the outer tray 24 relative to the tray support 22. As the outer tray 24 is pivoted, the rotation stop bar 56 can catch a complementary structure of the tray support 22, causing the outer tray to hold in a desired pivoted position.

Figure 3:
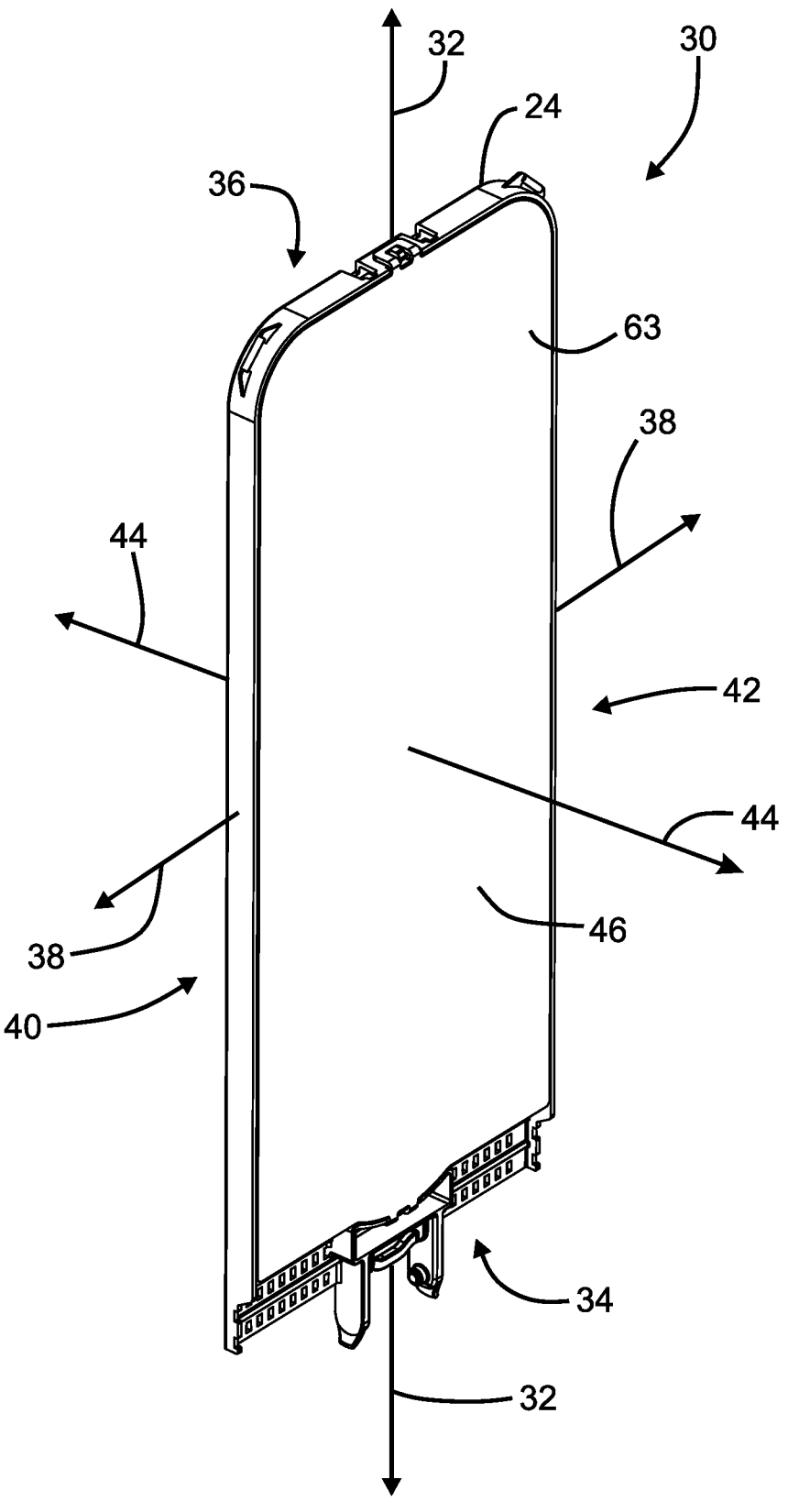
FIG. 3 is a perspective view of an optical fiber management assembly according to the present disclosure in a covered configuration.
Figure 4:
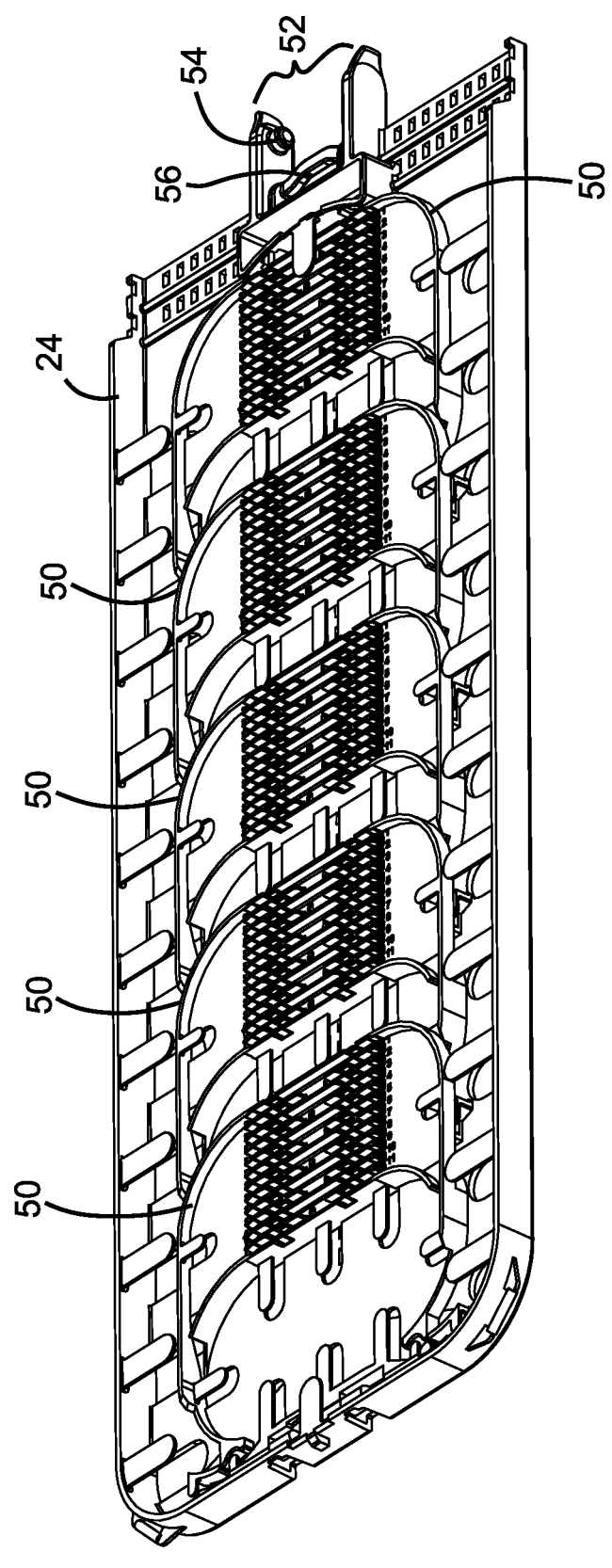
FIG. 4 is a perspective view of the optical fiber management assembly of FIG. 3 in an uncovered configuration.
Figure 6:
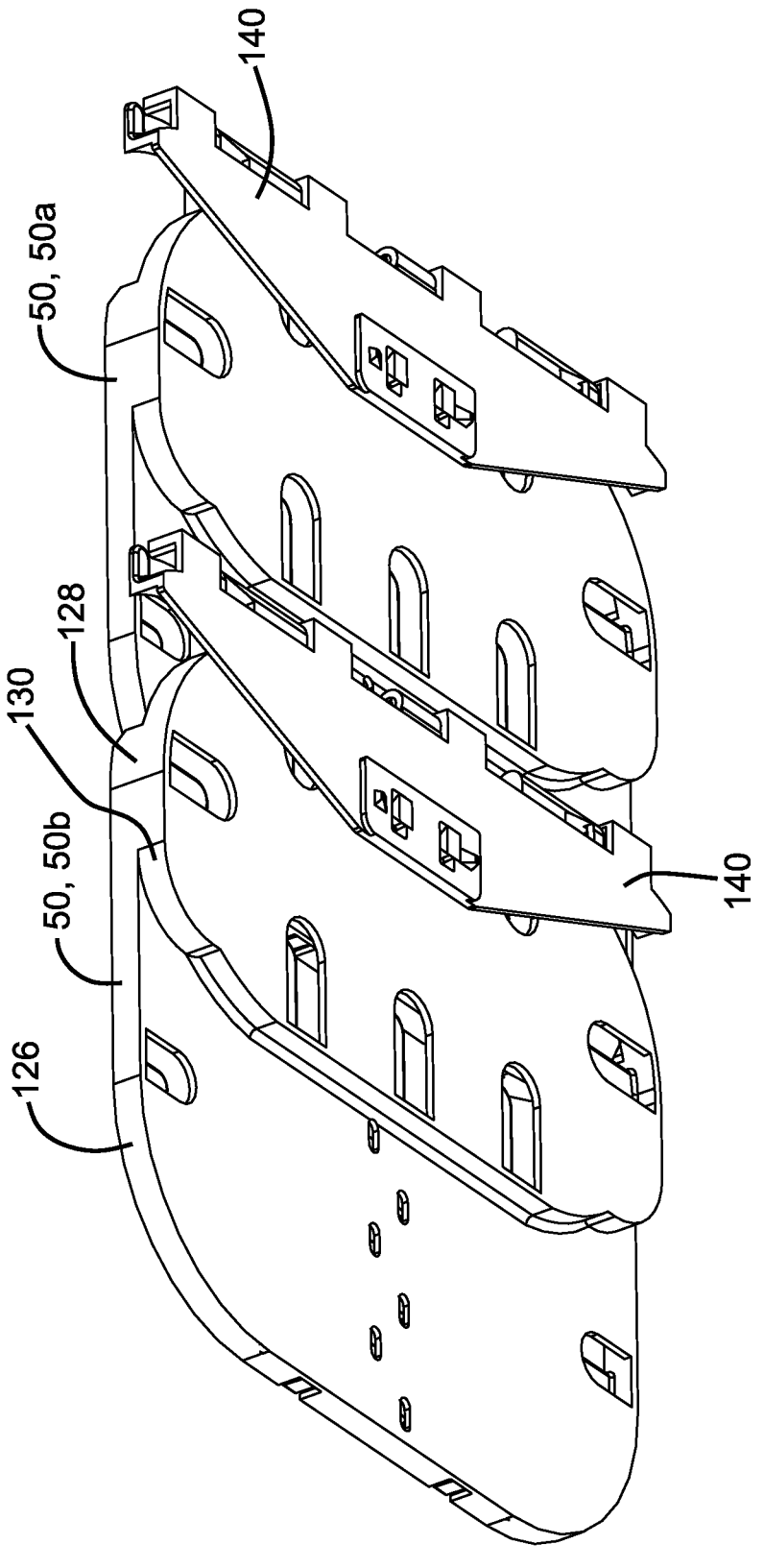
FIG. 6 is a further perspective view of the subassembly of FIG. 5.
Figure 7:
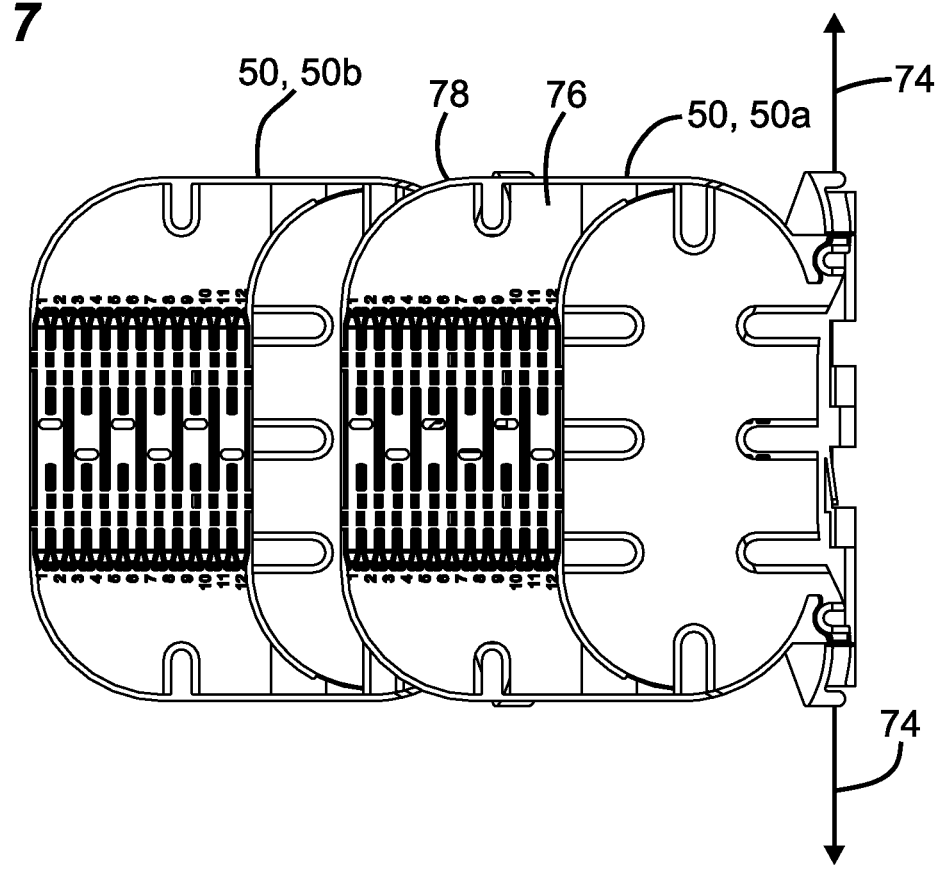
FIG. 7 is a top planar view of the subassembly of FIG. 5.
Figure 8:
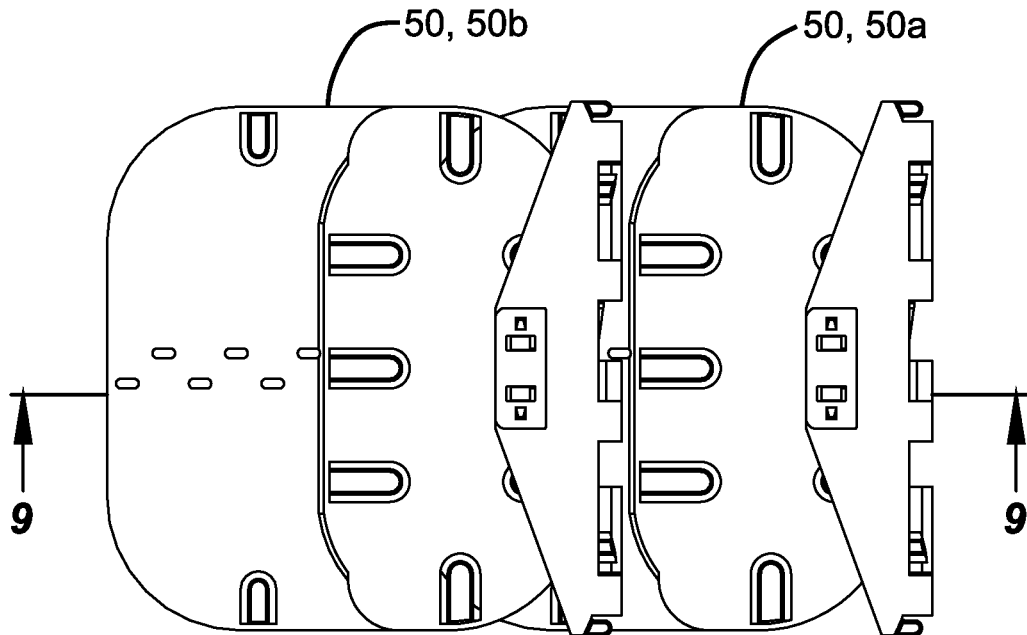
FIG. 8 is a bottom planar view of the subassembly of FIG. 5.
Figure 9:
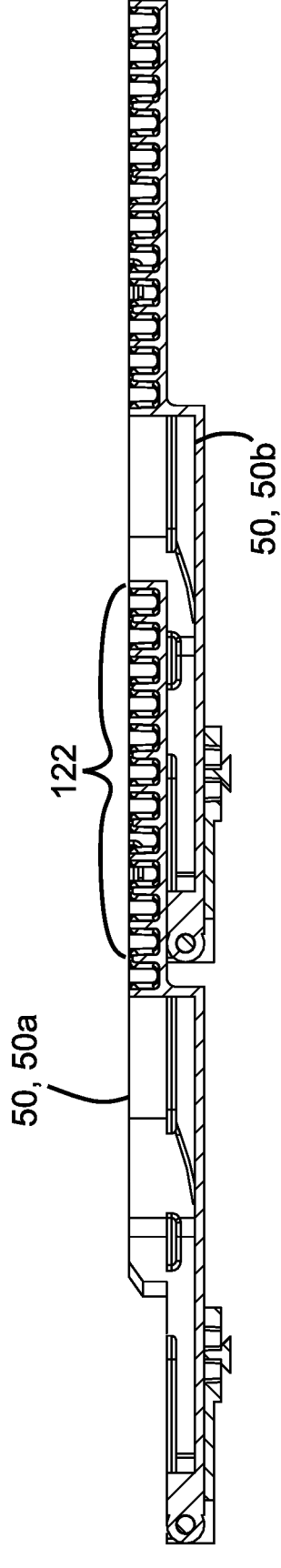
FIG. 9 is a cross-sectional view of the subassembly of FIG. 5 along the line 9-9 in FIG. 8.
Figure 10:
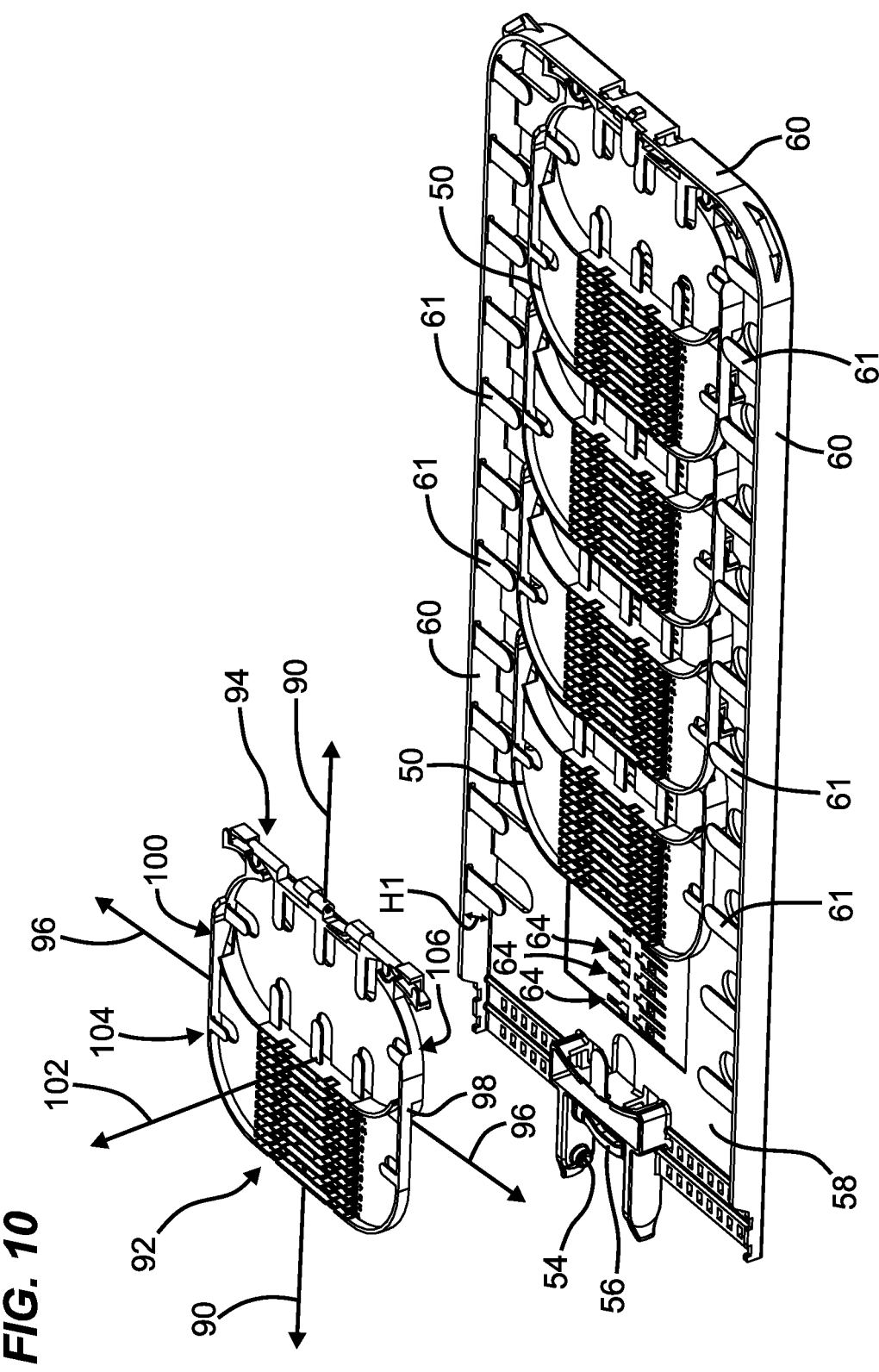
FIG. 10 is a perspective, partially exploded view of the optical fiber management assembly of FIG. 4.
Figures 11, 12:
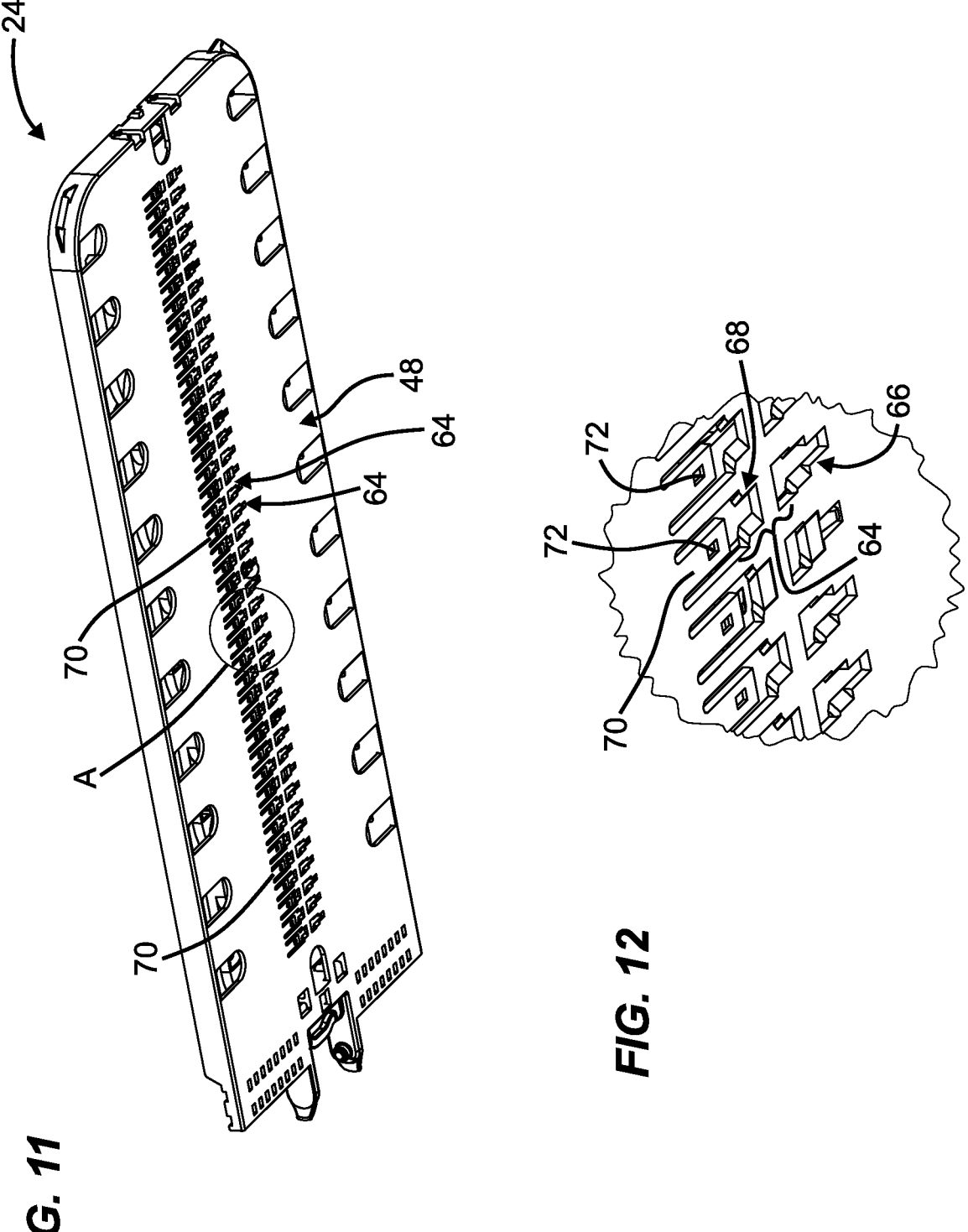
FIG. 11 is a bottom perspective view of the fiber management assembly of FIG. 4.
FIG. 12 is an enlarged view of the called-out portion A of FIG. 11.
Figure 13:
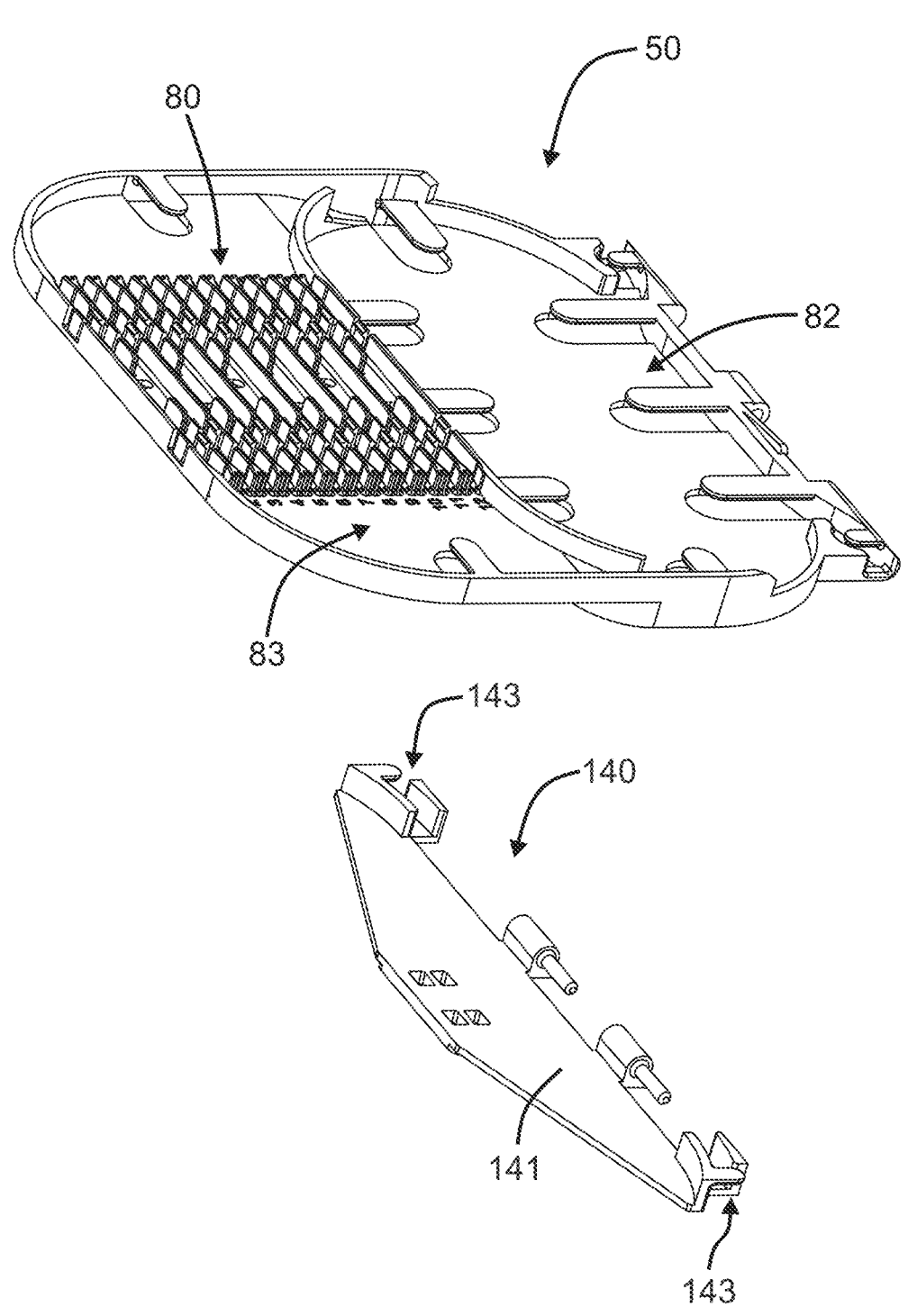
FIG. 13 is a perspective, exploded view of a subassembly of an inner tray and an adapter of the optical fiber management assembly of FIG. 4.
Figure 14:
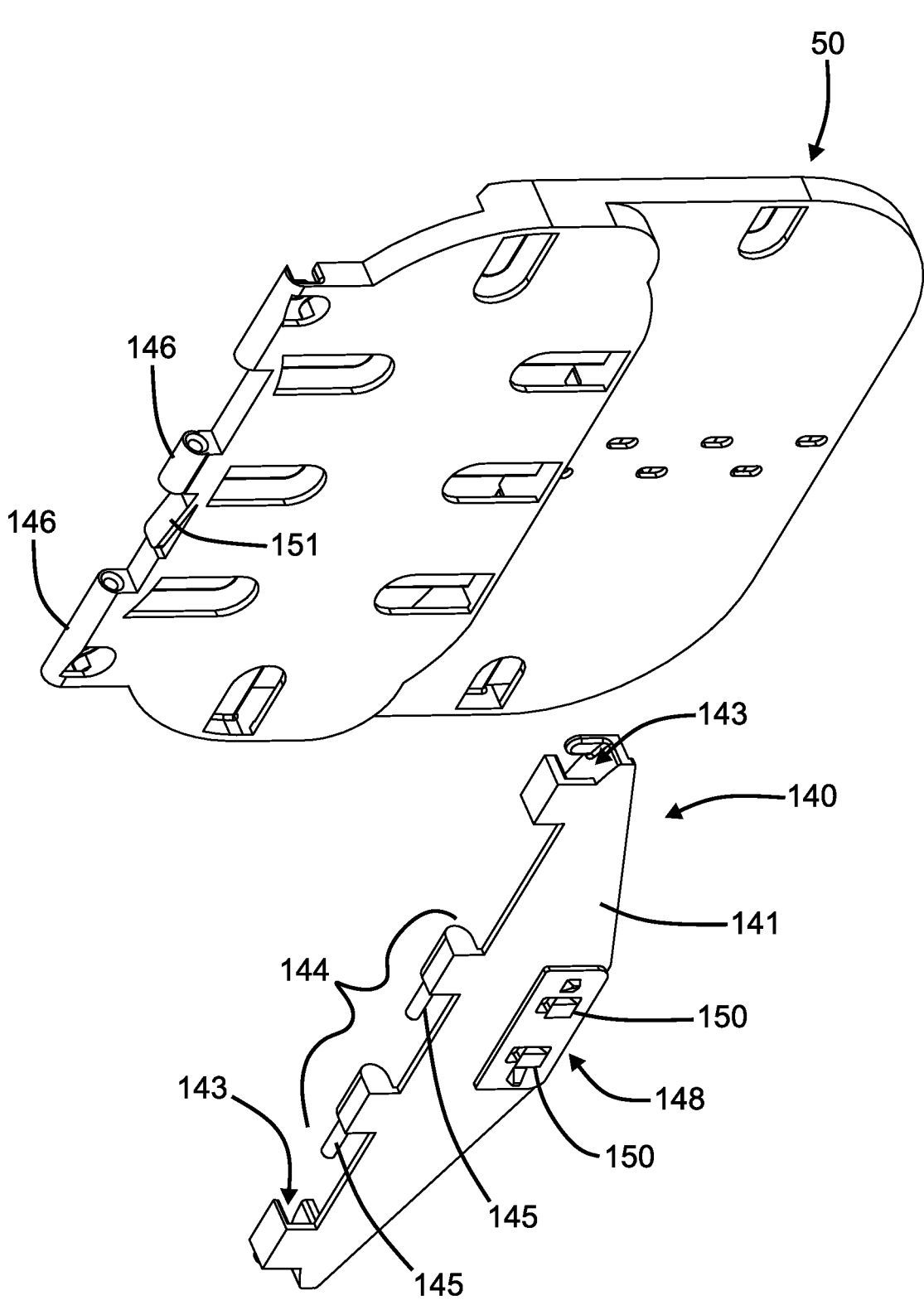
FIG. 14 is a further perspective, exploded view of the subassembly of FIG. 13.

The outer tray 24 includes a planar fiber management surface 58 and a wall 60 extending away from the fiber management surface 58 about a portion of the perimeter of the fiber management surface 58. In FIG. 3, the fiber management surface 58 is covered with a cover 63, which connects to the wall 60. In other figures, the cover 63 is removed. Typically, the outer trays 24 are covered with covers 63 when they are not being worked on.

A height H1 of the wall 60 is, in some examples, greater than a transverse width of a fiber ribbon, such as a flat fiber ribbon or a rollable fiber ribbon. For example, a typical flat 12-fiber ribbon has a transverse dimension (perpendicular to the longitudinal axes of the fibers) of about 3.2 millimeters. Thus, in some examples, the height H is greater than 3.2 millimeters.

The outer tray 24 includes a plurality of fingers 61 extending inwardly from the wall 60. The fingers 61 act as fiber retainers to retain looped fiber at or near the outer perimeter of the fiber management surface 58.

The fiber management surface 58 defines a plurality of mounting structures 64 for mounting fiber management components, such as splice holders, splitter holders, and adapters that hingedly couple to the inner trays 50. Each mounting structure 64 includes a pair of side by side tapered openings 66, 68 and a cantilever arm 70. Projections of a fiber management component are inserted downward into the openings 66, 68 causing the cantilever arm 70 to flex downward. The fiber management component is then slid laterally such that the projections enter the tapered regions of the openings 66, 68 which releases the cantilever arm 70 to its relaxed position in which it blocks or inhibits lateral sliding of the projections out of the tapers and thereby acts as a retainer. Engagement of the projections and the tapered regions forms a dovetail connection between the fiber management component and the mounting structure 64. To remove the fiber management component the cantilever arm 70 can be flexed downward (e.g., by hooking the eye 72 of the cantilever arm 70), allowing the projections of the fiber management component to be slid out of the tapered regions of the openings 66, 68.

The outer tray 24 can mount up to 5 (e.g., 0, 1, 2, 3, 4, or 5) of the inner trays 50 in a pivotal fashion using the mounting structures 64. The mounting structures 64 are arranged in a longitudinal column. Thus, depending on the size of the inner trays, the exact longitudinal mounting position of each tray can be adjusted by using a suitably positioned one or more of the mounting structures 64. It should be appreciated that more than 5 inner trays that are smaller than the inner trays 50 may be accommodated by the outer tray 24, or fewer than 5 trays that are larger than the inner trays 50 may be accommodated by the outer tray 24. If fewer than 5 of the inner trays 50 are mounted to the outer tray 24, then some of the mounting structures 64 can be used to directly mount other fiber management components, such as splice holders or splitter holders. The inner trays 50 are generally configured to manage loose, individual fibers that are spliced together at splice holders mounted to the inner trays 50. Loops and/or partial loops of the loose fibers can be stored at or near portions of the perimeters of the fiber management surfaces of the inner trays 50. Thus, it can be appreciated that a variety of routing and splicing schemes, and other fiber management actions, with loose fibers and/or fiber ribbons can be performed using the outer tray 24 and zero or more of the inner trays 50 pivotally mounted thereto.

Two such routing and splicing schemes will be described below in connection with FIGS. 19-21.

Fibers can enter the tray 24 at sides 40 and 42 at the proximal end 34 where there is no wall 60. For example, provider side fibers can enter at one of the sides and subscriber side fibers to which the provider side fibers are spliced at splices supported by the tray 24 can enter the tray 24 at the other side.

Each inner tray 50 extends along a longitudinal axis 90 between a proximal end 92 and a distal end 94. Each inner tray 50 extends along a transverse axis 96 between a first side 98 and a second side 100, the transverse axis 96 being perpendicular to the longitudinal axis 90. Each inner tray 50 extends along a vertical axis 102 between a top 104 and a bottom 106, the vertical axis 102 being perpendicular to the longitudinal axis 90 and the transverse axis 96.

When mounted to the outer tray 24, an inner tray 50 can be pivoted about a pivot axis 74 away from the fiber management surface 58 of the outer tray 24 to allow access to another inner tray for managing fiber thereon. Once the work has been performed, the inner tray 50 can be pivoted about the pivot axis 74 down toward the fiber management surface 58 so that the outer tray 24 can be covered and stored in the closure. The pivot axes 74 of the inner trays 50 are generally parallel to the transverse axis 38.

Figure 15:
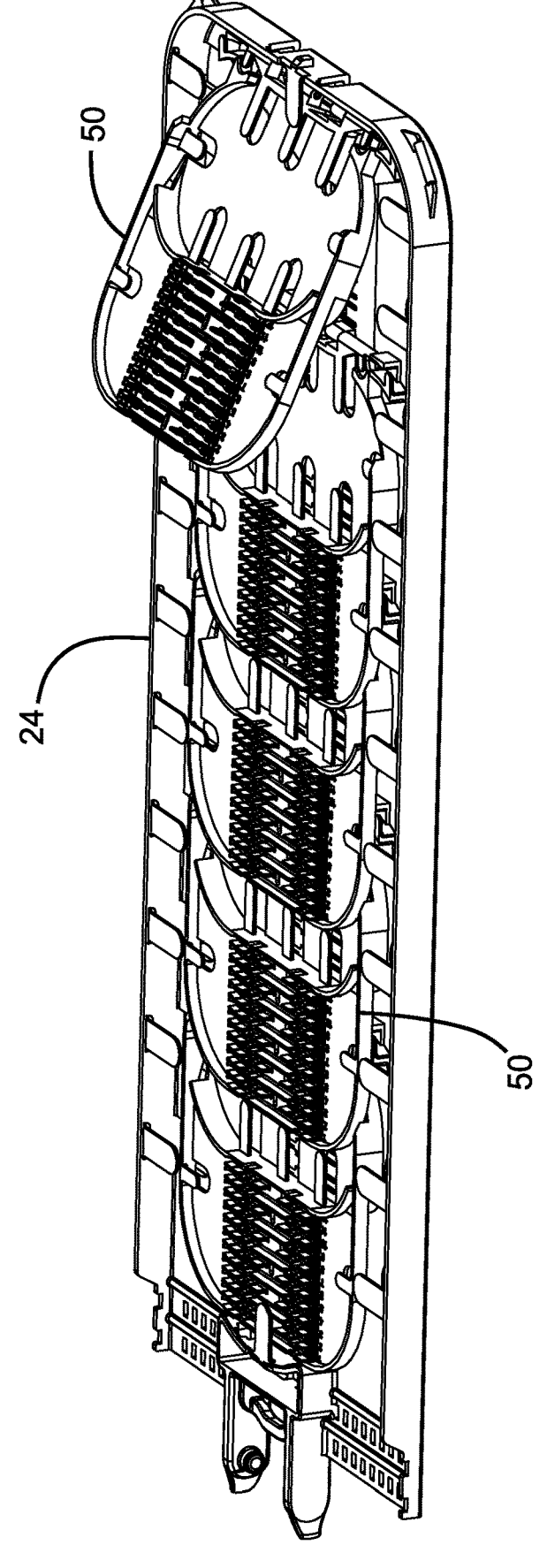
FIG. 15 is a perspective view of the optical fiber management assembly of FIG. 4, including one of the inner trays in a pivoted-up position.
Figure 16:
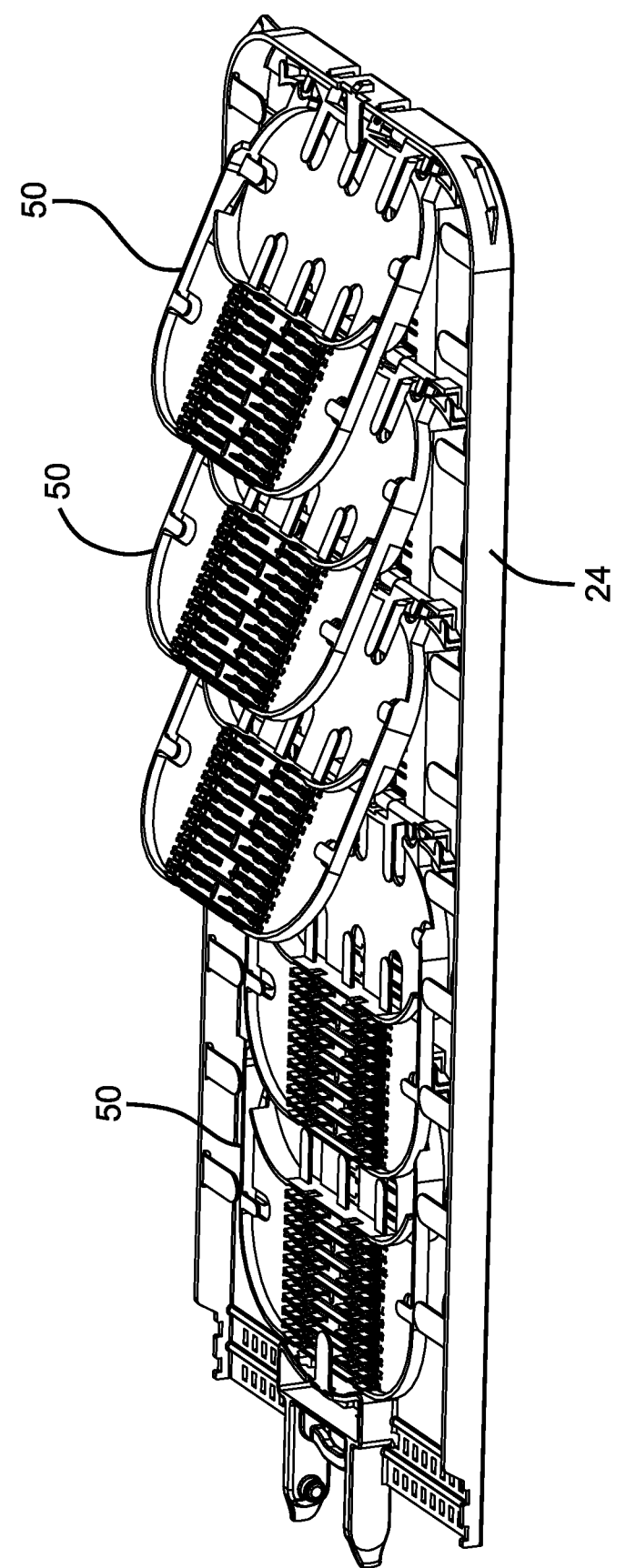
FIG. 16 is a perspective view of the optical fiber management assembly of FIG. 4, including three of the inner trays in pivoted-up positions.
Figure 17:
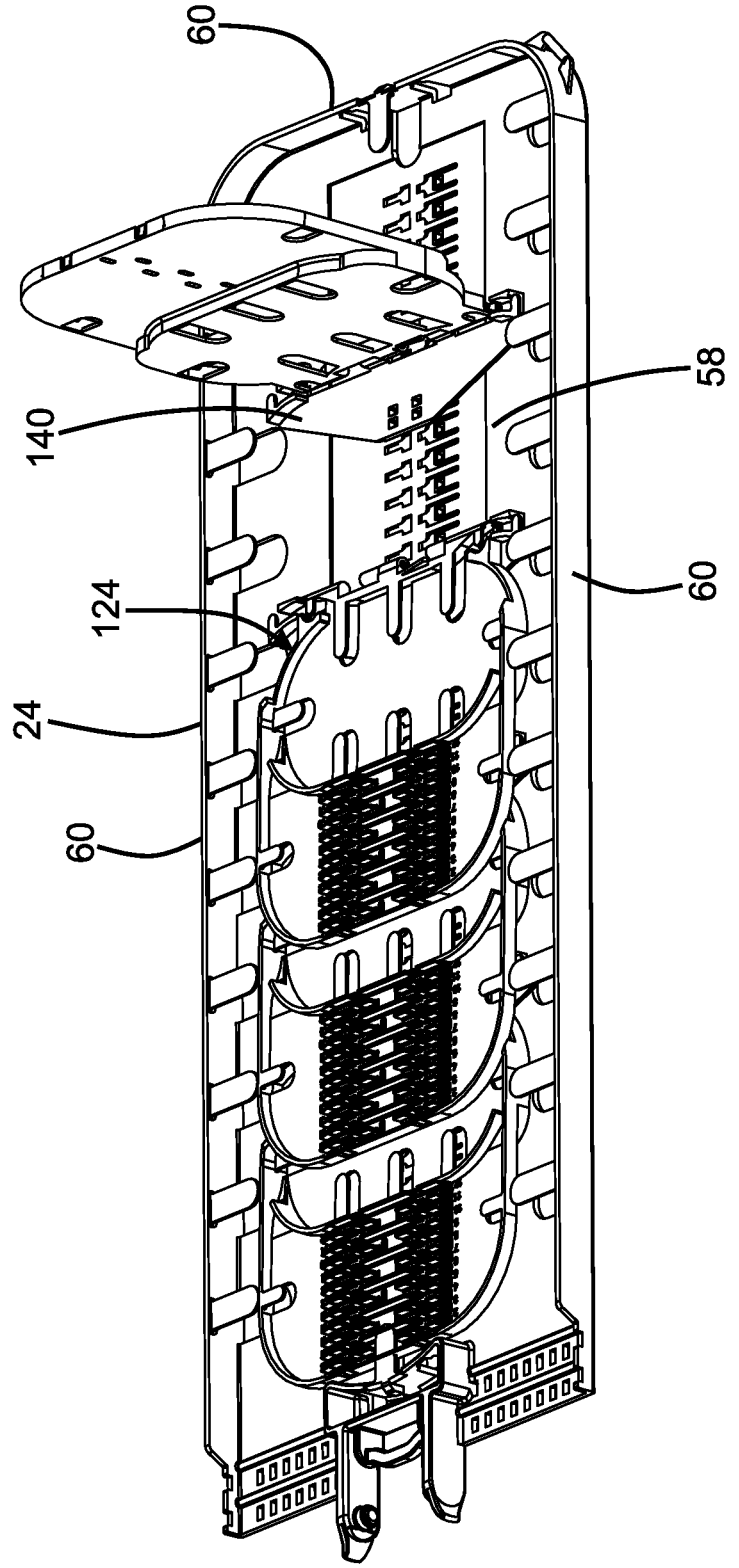
FIG. 17 is a perspective view of a portion of the optical fiber management assembly of FIG. 4, including one of the inner trays in a 90 degree pivoted up position.
Figure 18:
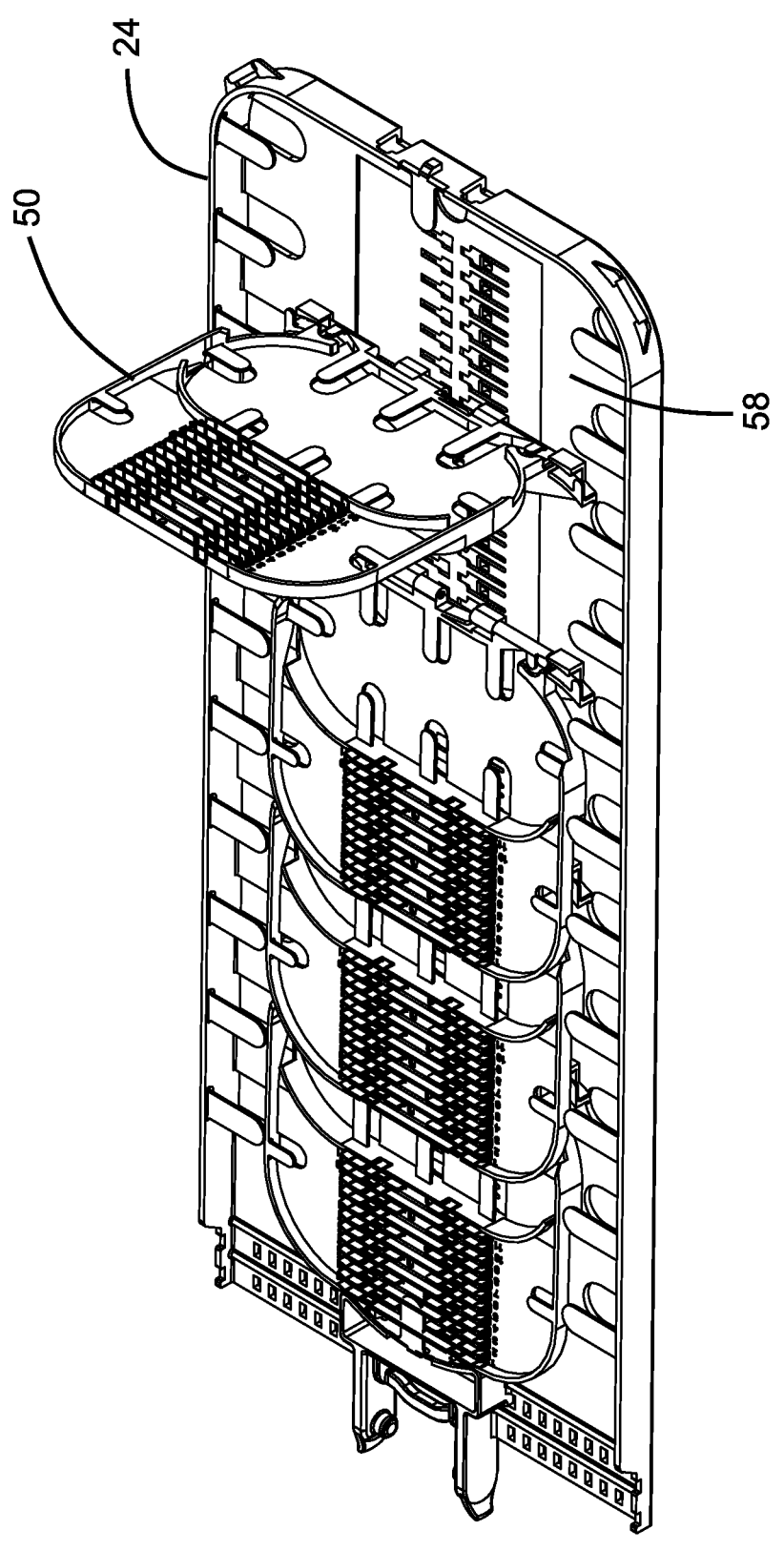
FIG. 18 is a perspective of a portion of the optical fiber management assembly of FIG. 4, including three of the inner trays in a 90 degree pivoted up position.

Different pivoted positions of one or more inner trays 50 are shown in FIGS. 15-18. In FIG. 15, one of five inner trays 50 is pivoted up about 45 degrees away from the fiber management surface 58. In FIG. 16, three of the five inner trays 50 are pivoted about 45 degrees away from the fiber management surface 58. In FIGS. 17-18, one of four inner trays 50 is pivoted about 90 degrees away from the fiber management surface 58. In some examples, the inner trays 50 can be pivoted to greater than 90 degrees. In some examples, a mechanism can be provided to hold up an inner tray in a pivoted up position. Such mechanisms can include mechanical interfacing between the hinge pin and hinge pin receiver or socket, for example, and/or other position retention structures that mechanically interface at certain rotation positions of the tray to resist or prevent further pivoting of the tray below a minimum threshold pivoting force. Non-limiting examples of such mechanisms are described in International PCT Patent Application Publication No. WO 2019/212887, International PCT Patent Application Publication No. WO 2019/160995, and International PCT Patent Application Publication No. WO 2020/205572, the contents of which applications are hereby fully incorporated by reference in their entireties.

Each of the inner trays 50 includes a planar fiber management surface 76 and a wall 78 extending away from the fiber management surface 76 about a portion of a perimeter of the fiber management surface 76.

A height H2 of the wall 78 is sufficiently high to safely accommodate a plurality of loose fibers (e.g., up to 12 or more loose fibers). For example, each inner tray 50 can mount a splice holder 80 for holding 12 splices. The 12 splices can be between the 12 loose fibers housed in first and second protective sheaths. For example, telecommunications cables can hold protective sheaths that hold groups of loose fibers. Alternatively, such a sheath can be sleeved onto portions of a group of loose fibers that extend beyond an outer cable jacket. In an example, each of the inner trays 50 is dedicated to splicing the fibers of one such sheath associated with a provider side cable entering the closure with the corresponding fibers of another such sheath associated with a subscriber side cable entering the closure. In this manner, the inner trays 50 can help to organize and keep track of fiber splices, including splices of loose fibers. Loops of the fibers that have splices stored on an inner tray 50 can be stored in the loop storage region 82 of the inner tray. Proximally positioned relative to the loop storage region 82 of each inner tray 50 is a splice region 83 where a splice holder or other fiber management component can be mounted to the fiber management surface 76. Optionally, the storage region 82 and the splice region 83 are divided by a divider wall 85 that is curved to aid looped fiber storage at the splice region 83.

Each inner tray 50 includes a plurality of fingers 84 extending inwardly from the wall 78. The fingers 84 act as fiber retainers to retain looped fiber or other segments of fibers at or near the outer perimeter of the fiber management surface 76, and/or within the loop storage region 82.

The fiber management surface 58 can define mounting structures for mounting fiber management components, such as splice holders and splitter holders. In some examples, these mounting structures can be of identical construction to the mounting structures 64 of the outer tray 24.

A splice holder 80 is attached or otherwise supported at the management surface 76. Each splice holder 80 accommodates 12 individual fiber splices.

Referring to FIGS. 5-9, a subassembly 120 of two of the inner trays 50 is shown. The subassembly 120 corresponds to a pair of adjacent inner trays 50 that may be mounted to the outer tray 24. As shown, when in a pivoted down position, adjacent pairs of the inner trays 50 overlap each other at an overlap region 122 that extends both longitudinally and transversely relative to the assembly 30. In addition, one of the trays 50a in each pair nests within the proximally adjacent tray 50b at the overlap region 122 within a recessed or nest portion 124 of the adjacent tray. The overlap region is over portion of the storage region 82. The fiber loop retainers in the overlap region and/or the loops storage region can be, but need not be, positioned lower on the inner tray 50 (e.g., lower relative to the wall 78) than the fingers in the splice region 83 of the tray 50 in order to accommodate nesting of the adjacent tray 50 at the overlap region 122. In some examples, the overlap region does not include any portions of the splice region 83. In addition, the bottom 106 of each tray includes a vertically shorter portion 126 and a vertically taller portion 128 that that is taller than the shorter portion 126, with a stepped portion defined by a vertical step 130 positioned between the shorter and taller portions. Due to the stepped portion, the fiber management surface 87 of the loop storage region 82 is recessed down, i.e., lower than, the fiber management surface 76 in the splice region 83. The divider wall 85 has a height H3 that is greater than the height H2, extending from the fiber management surface 87 of the loop storage region 82 upward to the same height as the wall 78. The height of the wall 78 steps downward at the locations 95 forming reduced height portions 97 of the wall 78 that define the nest portion 124. The distally positioned tray 50a rests on the reduced height portions 97 of the tray 50b when the trays 50a and 50b are in the nested, lie-flat configuration. The shorter portion 126 rests in the nest portion 124 of the adjacent tray thereby allowing the trays 50 to lie flat when they are in the pivoted-down configuration for storage.

In some examples, the inner trays can mount directly to the outer tray at the mounting structures 64.

In the example shown, adapters 140 are provided to pivotally mount the inner trays 50 to the outer tray 24. Each adapter 140 includes a body 141, a first coupling portion 144 integral with, or attached to, the body 141 and having hinge elements 145 (in this case pins) configured to pivotally mate about the pivot axis 74 with complementary hinge elements 146 (in this case pin receivers) at the distal end 94 of an inner tray 50. It should be appreciated that all or some of the hinge elements of the tray and adapter can be reversed and still remain complementary to one another. The body 141 defines opposing guide channels 143 on either side of the adapter 140 for guiding fiber from the outer tray 24 onto the inner tray 50 corresponding to the adapter 140 via one of the guide channels 143.

The adapter 140 also includes a second coupling portion 148 integral with, or attached to, the body 141 and configured to couple to a mounting structure 64 of the outer tray 24 in the slide-to lock manner described above. The second coupling portion 148 includes projections or tenons 150 configured to dovetail into the tapered regions of the openings of a mounting structure. The second coupling portion 148 can be structurally identical to the corresponding coupling portion of another fiber management component (e.g., a splice holder 80 or splitter holder) such that all such components are compatible with the mounting structure 64.

Each of the inner trays 50 includes a flexible retaining tab 151 positioned to impede disengagement of the hinge elements of the first coupling portions 145 from the hinge elements 146 of the inner tray 50. Flexing the tab 151 allows the hinge formed between the hinge elements 145 and 146 to come part to release the tray 50 from the adapter 140. Alternatively, the flexible retaining tab 151 can be component of the adapter.

Fibers can enter an inner tray 50 via entryways 152, 154 (from the guide channels 143) at opposite sides 40 of the inner tray 50, and from the entryways the fibers can be routed in one or more loops or loop portions on the fiber management surface 76 to the appropriate splice holding location defined by the splice holder 80. For example, provider side fibers can enter through one of the entryways 152, 154 and subscriber side fibers to which the provider side fibers are spliced at splices supported by the tray 50 can enter the tray 50 through the other entryway.

Figure 20:
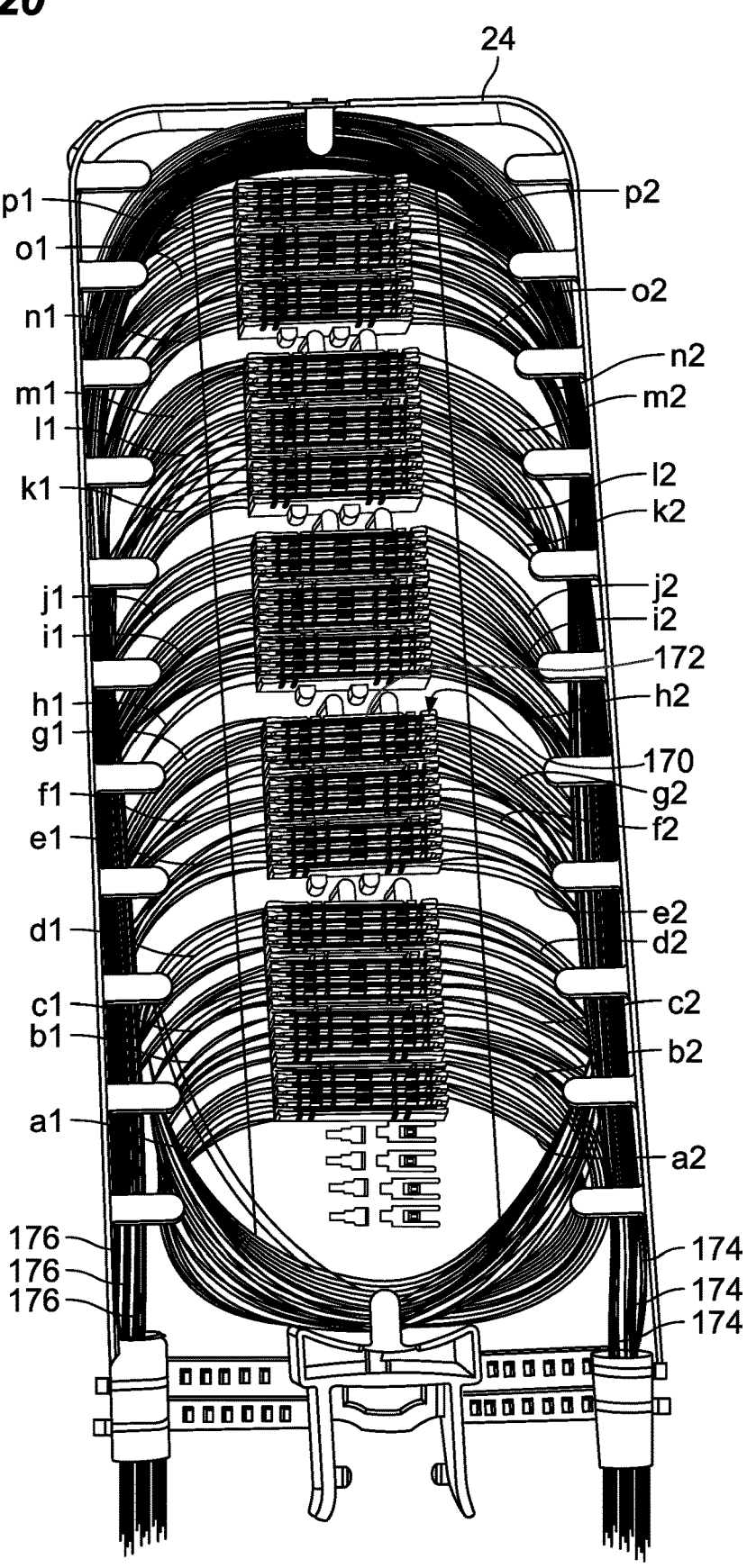
FIG. 20 is a schematic view of an optical fiber management assembly configured in a second fiber routing configuration.

Referring to FIG. 20, in a first fiber routing scheme using just the outer tray 24 of the assembly 30 (FIG. 3) and no inner trays 50, 16 first groups a1, b1, c1, d1, e1, f1, g1, h1, i1, j1, k1, l1, m1, n1, o1, p1 of color-coded fibers each containing 12 fibers are spliced to 16 second groups a2, b2, c2, d2, e2, f2, g2, h2, i2, j2, k2, l2, m2, n2, o2, p2 of correspondingly color-coded groups of fibers each containing 12 fibers for a total of 192 splices of 192 pairs of fibers supported on the outer tray 24. Each first group of fibers and each second group of fibers extends from a 12-fiber sheath 176, 174 of loose fibers. Alternatively, each first group of fibers and each second group of fibers extends from a 12-fiber ribbon and the mass-fusion ribbon splices are supported by splice holders mounted to the tray 24.

At each splice location 172 at each splice holder 170 there is a splice body or multiple splice bodies holding multiple pairs of spliced fibers. The splice holders 170 mount to the tray 24 in the slide-to-lock manner described above.

Figure 19:
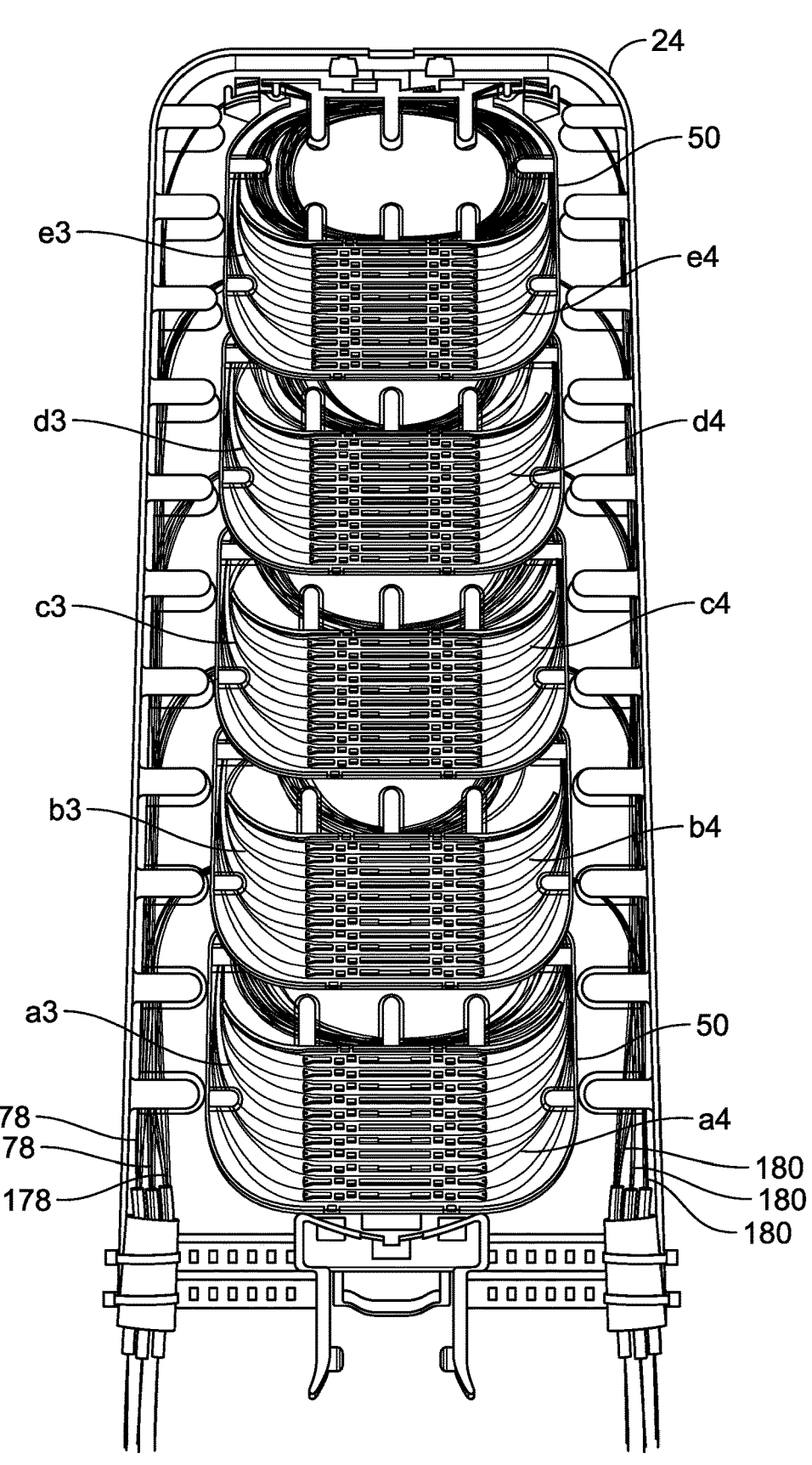
FIG. 19 is a view of an optical fiber management assembly according to the present disclosure configured in a first fiber routing configuration.
Figure 21:
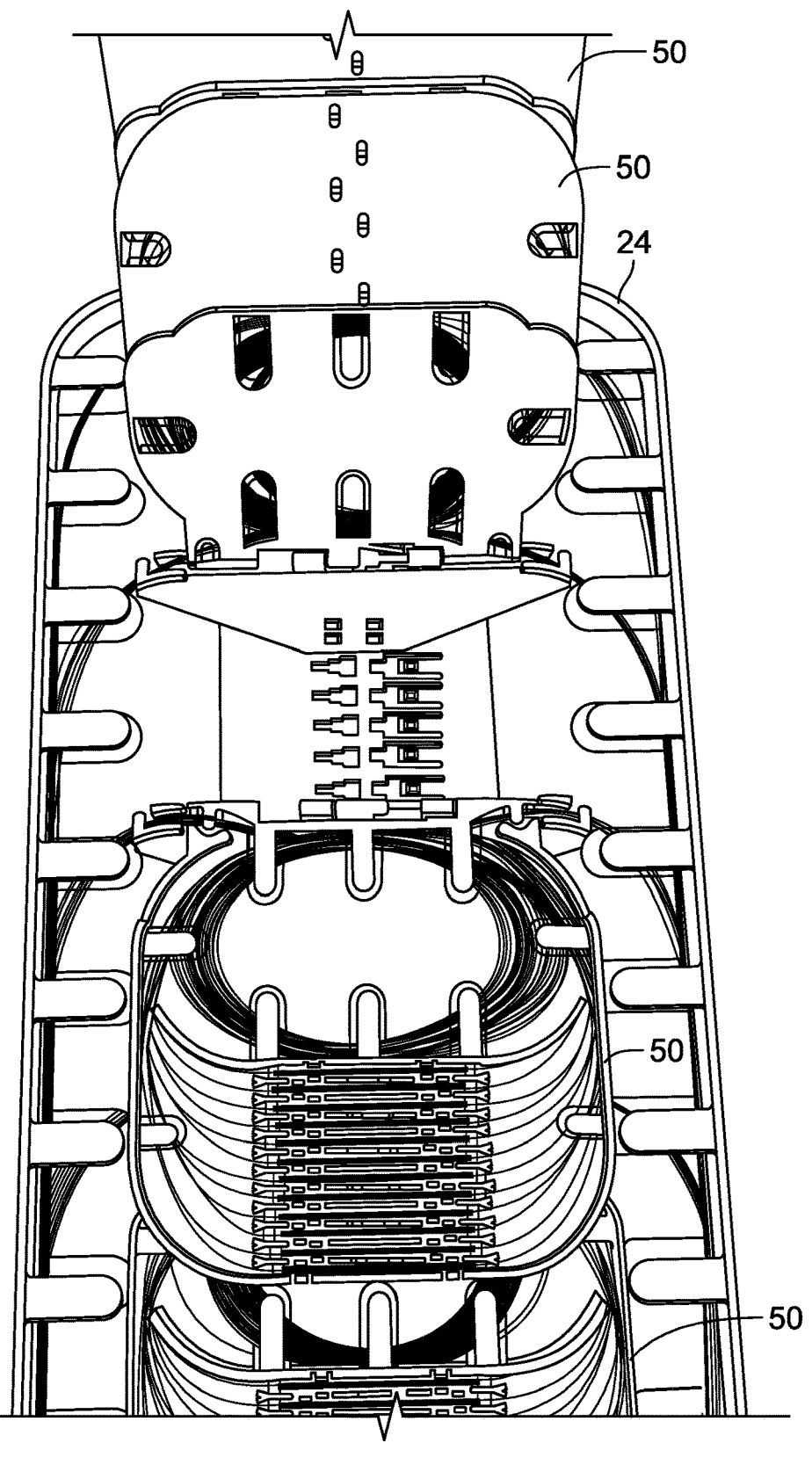
FIG. 21 is an enlarged view of a portion of the fiber routing configuration of FIG. 19, with two of the inner trays of the assembly in a pivoted up position.

Referring to FIGS. 19 and 21, in a second fiber routing scheme using the outer tray 24 of the assembly 30 (FIG. 3) and five inner trays 50 pivotally mounted to the outer tray 24, five third groups a3, b3, c3, d3, e3 of color-coded fibers each containing 12 fibers are spliced to five fourth groups a4, b4, c4, d4, e4 of correspondingly color-coded groups of fibers each containing 12 fibers for a total of 60 splices supported in groups of 12 by each of the five inner trays 50. Each third group of fibers and each fourth group of fibers extends from a 12-fiber sheath 178, 180 of loose fibers. Each splice location of each splice holder 80 on each tray 50 includes 12 splice holding locations to support 12 fiber splices. In other examples, the sheaths can hold more or fewer fibers than 12, such as 4, 6, 8, 10, 12 or more fibers and splices accommodated accordingly.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. An optical fiber management assembly, comprising:
   a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber at the first fiber management surface, the first fiber management surface defining a plurality of first mounting structures for mounting fiber management components; and
   a plurality of second fiber management trays pivotally mountable to the first mounting structures such that the plurality of second fiber management trays can be pivoted away from and toward the first fiber management surface, each of the second fiber management trays including a planar second fiber management surface and a second wall extending away from the second fiber management surface about a portion of a perimeter of the second fiber management surface, the second fiber management trays including pluralities of fiber retainers to retain looped fiber or portions of looped fiber at the second fiber management surfaces,
   wherein the second fiber management surfaces define a plurality of second mounting structures for mounting fiber management components, wherein the first and second mounting structures are of identical construction.

2. The optical fiber management assembly of claim 1, wherein the plurality of second fiber management trays are pivotally mounted to the fiber mounting structures, and further comprising:
   a fiber management component attached to the second fiber management structures; and
   another fiber management component mounted to one or more of the first mounting structures, the another fiber management component being an optical fiber splice holder or an optical fiber splitter holder.

3. The optical fiber management assembly of claim 1, wherein the first wall is higher than a transverse width of a 12-fiber fiber ribbon that can be spliced at a ribbon fiber splice holder mounted to one of the first mounting structures; and
   wherein the second wall is shorter than a transverse width of a 12-fiber fiber ribbon that can be spliced at a ribbon fiber splice holder mounted to one of the first mounting structures.

4. The optical fiber management assembly of claim 1, further comprising a plurality of adapters, the adapters including first coupling portions configured to connect to the second fiber management trays and second coupling portions configured to connect to the first mounting structures.

5. The optical fiber management assembly of claim 4, wherein each adapter body defines a guide channel for guiding a fiber from the first fiber management tray to one of the plurality of second fiber managements tray via the guide channel.

6. The optical fiber management assembly of claim 1, wherein the first coupling portions include hinge elements configured to pivotally mate with complementary hinge elements of the second fiber management trays; and wherein the plurality of second trays include flexible tabs positioned to impede disengagement of the hinge elements of the first coupling portions from the hinge elements of the second fiber management trays.

7. The optical fiber management assembly of claim 1, wherein the first fiber management tray is configurable in a first fiber routing configuration in which at least 192 first pairs of fibers can be spliced to each other at 192 splices held by splice holders mounted directly to the first mounting structures;
wherein the first fiber management tray is configurable in a second fiber routing configuration in which at least 60 second pairs of fibers can be spliced to each other at splices held by splice holders mounted at fiber management surfaces of up to five of the plurality of second fiber management trays, the second fiber management trays being pivotally mounted to the first mounting structures; and
wherein the first fiber management tray is configurable in a third fiber routing configuration in which fewer than 192 of the first pairs of fibers can be spliced to each other at splices held by splice holders mounted directly to the first mounting structures, and fewer than 60 of the second pairs of fibers can be spliced to each other at splices held by splice holders mounted at fiber management surfaces of up to four of the plurality of second fiber management trays.

8. The optical fiber management assembly of claim 1, wherein each of the plurality of second fiber management trays extends along a horizontal axis from a proximal end to a distal end and along a vertical axis from a top to a bottom;
wherein each second fiber management surface faces upward and is configured to support an optical fiber splice holder; and
wherein each of the plurality of second fiber management trays includes a planar upward facing third fiber management surface configured to support a looped fiber, the third fiber management surface being positioned distally from the second fiber management surface along the horizontal axis and lower than the second fiber management surface along the vertical axis.

9. The optical fiber management assembly of claim 8, further comprising, for each of the plurality of second fiber management trays:
a vertically extending dividing wall positioned between the second fiber management surface and the third fiber management surface; and
a vertical step at a bottom of the second fiber management tray, the vertical step transitioning the second fiber management surface to the third fiber management surface.

10. The optical fiber management assembly of claim 9, wherein, for each of the plurality of second fiber management trays, the second fiber management surface defines a splice region and the third fiber management surface defines a fiber loop storage region, wherein the splice region includes a splice region wall about at least a portion of a perimeter of the second fiber management surface, the splice region wall being vertically shorter than the dividing wall and extending to the same vertical height as the dividing wall.

11. The optical fiber management assembly of claim 8, wherein, for each of the plurality of second fiber management trays, the second fiber management surface defines a splice region and the third fiber management surface defines a fiber loop storage region, wherein the splice region includes a plurality of horizontally extending first fiber retaining fingers, wherein the fiber loop storage region defines a plurality of horizontally extending second fiber retaining fingers, and wherein the second fiber retaining fingers are vertically lower than the first fiber retaining fingers.

12. An optical fiber management assembly, comprising:
a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber at the first fiber management surface, the first fiber management surface defining a plurality of first mounting structures for mounting fiber management components; and
a plurality of second fiber management trays pivotally mountable to the first mounting structures such that the plurality of second fiber management trays can be pivoted away from and toward the first fiber management surface, each of the second fiber management trays including a planar second fiber management surface and a second wall extending away from the second fiber management surface about a portion of a perimeter of the second fiber management surface, the second fiber management trays including pluralities of fiber retainers to retain looped fiber or portions of looped fiber at the second fiber management surfaces,
wherein the plurality of second fiber management trays are pivotally mounted to the first fiber mounting structures;
wherein when the second fiber management trays are in pivoted down positions, adjacent pairs of the second fiber management trays overlap each other;
wherein the plurality of second fiber management trays are pivotally mounted to the first fiber mounting structures; and
wherein when the second fiber management trays are in pivoted down positions, one of the second fiber management trays of each of the adjacent pairs nests within a portion of the other of the trays of the pair.

13. An optical fiber management assembly, comprising:
a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber at the first fiber management surface, the first fiber management surface defining a plurality of first mounting structures for mounting fiber management components; and
a plurality of second fiber management trays pivotally mountable to the first mounting structures such that the plurality of second fiber management trays can be pivoted away from and toward the first fiber management surface, each of the second fiber management trays including a planar second fiber management surface and a second wall extending away from the second fiber management surface about a portion of a perimeter of the second fiber management surface, the second fiber management trays including pluralities of fiber retainers to retain looped fiber or portions of looped fiber at the second fiber management surfaces, wherein bottoms of the second fiber management trays facing away from the second fiber management surfaces include stepped portions.

14. An optical fiber management assembly, comprising:

a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber at the first fiber management surface, the first fiber management surface defining a plurality of first mounting structures for mounting fiber management components; and a plurality of second fiber management trays pivotally mountable to the first mounting structures such that the plurality of second fiber management trays can be pivoted away from and toward the first fiber management surface, each of the second fiber management trays including a planar second fiber management surface and a second wall extending away from the second fiber management surface about a portion of a perimeter of the second fiber management surface, the second fiber management trays including pluralities of fiber retainers to retain looped fiber or portions of looped fiber at the second fiber management surfaces, wherein the first mounting structures each include a cantilever portion and a slide-to-lock-portion, the cantilever portion being positioned to inhibit a slide-to-unlock movement of a fiber management component mounted to the first mounting structure.

15. An optical fiber management assembly, comprising:

a first fiber management tray including a planar first fiber management surface and a first wall extending away from the first fiber management surface about a portion of a perimeter of the first fiber management surface, the first fiber management tray including a plurality of fiber retainers to retain looped fiber or portions of looped fiber at the first fiber management surface, the first fiber management surface defining a plurality of first mounting structures for mounting fiber management components; and a plurality of second fiber management trays pivotally mountable to the first mounting structures such that the plurality of second fiber management trays can be pivoted away from and toward the first fiber management surface, each of the second fiber management trays including a planar second fiber management surface and a second wall extending away from the second fiber management surface about a portion of a perimeter of the second fiber management surface, the second fiber management trays including pluralities of fiber retainers to retain looped fiber or portions of looped fiber at the second fiber management surfaces, wherein the first fiber management tray is configured to pivotally mount to a tray support positioned within a sealable and re-enterable fiber optic closure.

* * * * *